US009132533B2

(12) United States Patent
Lesche et al.

(10) Patent No.: US 9,132,533 B2
(45) Date of Patent: Sep. 15, 2015

(54) SPARK PLUG REMOVAL AND EXTRACTION TOOL

(71) Applicant: Service Solutions U.S. LLC, Wilmington, DE (US)

(72) Inventors: Pamela Lesche, Bridgeton, NJ (US); George Lesche, Bridgeton, NJ (US); Larry W. Betcher, Northfield, MN (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 207 days.

(21) Appl. No.: 13/669,111

(22) Filed: Nov. 5, 2012

(65) Prior Publication Data

US 2013/0111750 A1 May 9, 2013

Related U.S. Application Data

(60) Provisional application No. 61/556,195, filed on Nov. 5, 2011.

(51) Int. Cl.
*B23B 13/06* (2006.01)
*B25B 13/48* (2006.01)

(52) U.S. Cl.
CPC ......... *B25B 13/483* (2013.01); *Y10T 29/49231* (2015.01)

(58) Field of Classification Search
CPC ............ B25B 3/483; B25B 5/10; B25B 5/102
USPC ........ 29/244, 270, 256, 265, 426.5, 258, 263, 29/264; 81/52, 53.2
See application file for complete search history.

(56) References Cited

U.S. PATENT DOCUMENTS

| | | | | |
|---|---|---|---|---|
| 2,086,587 | A * | 7/1937 | Thomson | 81/114 |
| D315,284 | S | 3/1991 | Parks | |
| 6,584,662 | B1 * | 7/2003 | Krick | 29/263 |
| 6,647,830 | B2 | 11/2003 | Marquardt | |
| 6,832,531 | B1 | 12/2004 | Marquardt | |
| 6,923,094 | B1 | 8/2005 | Marquardt | |
| 7,104,164 | B2 | 9/2006 | Jirele et al. | |
| 7,814,814 | B2 | 10/2010 | Whitehead | |
| 7,987,572 | B2 | 8/2011 | Badman et al. | |
| 2009/0211408 | A1 | 8/2009 | Peng et al. | |

OTHER PUBLICATIONS

Heisner, B. et al., "Ford 3V Spark-Plug Service: Poor Design Equals Opportunity," Undercar Digest Magazine, Jan. 2010, pp. 50-53.

(Continued)

*Primary Examiner* — Jason L Vaughan
(74) *Attorney, Agent, or Firm* — Baker & Hostetler LLP

(57) ABSTRACT

Apparatus and methods for the removing of a spark plug, or portions thereof, from a cylinder head are disclosed. The apparatus includes a lower socket with a longitudinal bore therethrough, a radial compression member disposed in the longitudinal bore of the lower socket, and a shaft disposed on a first end of the radial compression member. The radial compression member includes an internal surface defining a concavity that faces a longitudinal axis of the lower socket. The method includes compressing the radial compression member in a radial direction toward a longitudinal axis of the spark plug terminal, thereby decreasing an outer dimension of the radial compression member in the radial direction.

15 Claims, 9 Drawing Sheets

(56) References Cited

OTHER PUBLICATIONS

"Instructions for Broken Spark Plug Remover for Ford 3Valve," Lisle Tool Instructions, 2 pages.

"Spark Plug Removal Instructions—5.4 3V, TSB 06-15-2," Ford Motor Company Online Publication, Jul. 14, 2006, pp. 1-4.

* cited by examiner

SPARK PLUG REMOVAL AND EXTRACTION TOOL

CROSS-REFERENCE TO RELATED APPLICATIONS

This application claims the benefit of U.S. Provisional Patent Application No. 61/556,195, titled Spark Plug Removal and Extraction Tool, filed Nov. 5, 2011, the disclosure of which is hereby incorporated by reference in its entirety.

FIELD OF THE INVENTION

The present invention relates to automotive tools, and more particularly to tools for removing a spark plug, or portions of a spark plug, from an engine.

BACKGROUND OF THE INVENTION

Some combustion engines require spark plugs to provide an ignition source for igniting air/fuel mixture residing within each cylinder. A spark plug may be threaded into the cylinder head of the engine, thereby locating a spark gap of the spark plug within an engine cylinder. The spark gap is defined by a space between the anode and the cathode of the spark plug. The cathode is normally grounded to the engine through the spark plug threads connecting the spark plug to the engine.

The spark plug anode is in electrical communication with an electric potential source, usually through an axial conductor. The axial conductor extends from the spark plug anode, through the spark plug, to an outer terminal contact. The outer terminal contact is usually in electrical communication with the electric potential source through a wire connected therebetween. An electric arc may be established across the spark gap when a sufficient electric potential is applied across the spark gap. In turn, the electric arc may provide sufficient ignition energy to ignite a fuel fuel-air mixture residing within the corresponding engine cylinder.

Many spark plugs include an axial conductor enclosed within a ceramic insulator, an outer terminal contact disposed at an end of the spark plug disposed outside the engine, a center electrode, a lower end contact terminal containing the tip of the spark plug and the spark gap, and a threaded cylindrical body that surrounds at least a middle portion of the spark plug and enables the plug to be threaded into the cylinder head.

Some spark plugs have well-documented histories of being difficult to remove from the cylinder heads of certain engines. At least one vehicle manufacturer incorporates a certain spark plug design which has proven difficult to remove from the cylinder head without breaking. The issue exists in some Ford Motor Company vehicles, as particularly described in Technical Service Bulletins TSB 06-15-2 and TSB 08-7-6. During removal of such spark plugs, the cylindrical tip may break and separate from the body of the threaded plug. The broken tip remains within the cylinder head and must be removed before a new plug can be threaded into the cylinder head.

Others have recognized difficulty of removing the Ford spark plugs from engines, and have proposed tools that use drills and taps to assist in the removal of the broken tips. After drilling and tapping threads into the broken spark plug tip, such tools are screwed into the plug tip, and both the tool and the tip are then pulled from the cylinder head together. However, the process of drilling and tapping the broken spark plug tip is both difficult and time consuming, at least in part because of the difficulties of aligning the drilling and tapping operations with the broken spark plug tip.

Thus, there exists a need for new apparatus and methods for extracting spark plugs from engines to address the problems discussed above.

SUMMARY OF THE INVENTION

Some embodiments of the invention relate to the field of automotive tools and more particularly to automotive tools for removing or extracting spark plugs, or portions thereof, from an engine.

One embodiment of the present invention is a spark plug removal and extraction tool comprising a lower socket, a radial compression member disposed in a longitudinal bore of the lower socket, and a shaft disposed on a first end of the radial compression member, where the radial compression member includes an internal surface defining a concavity that faces a longitudinal axis of the lower socket.

Another embodiment of the invention is a tool kit for removing a spark plug from an engine comprising a lower socket including first threads, a first torque engagement portion configured to transmit a first torque to the lower socket, and a second torque engagement portion configured to couple with a torque engagement portion of the spark plug; a radial compression member including an internal surface defining a concavity; and a shaft including second threads complementary to the first threads of the lower socket, and a third torque engagement portion configured to transmit a second torque to the shaft.

Yet another embodiment of the invention features a method comprising disposing a radial compression member about a terminal end of a spark plug; compressing the radial compression member in a radial direction toward a longitudinal axis of the terminal end of the spark plug, thereby decreasing an outer dimension of the radial compression member in the radial direction; and applying an axial force on the radial compression member away from the spark plug.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
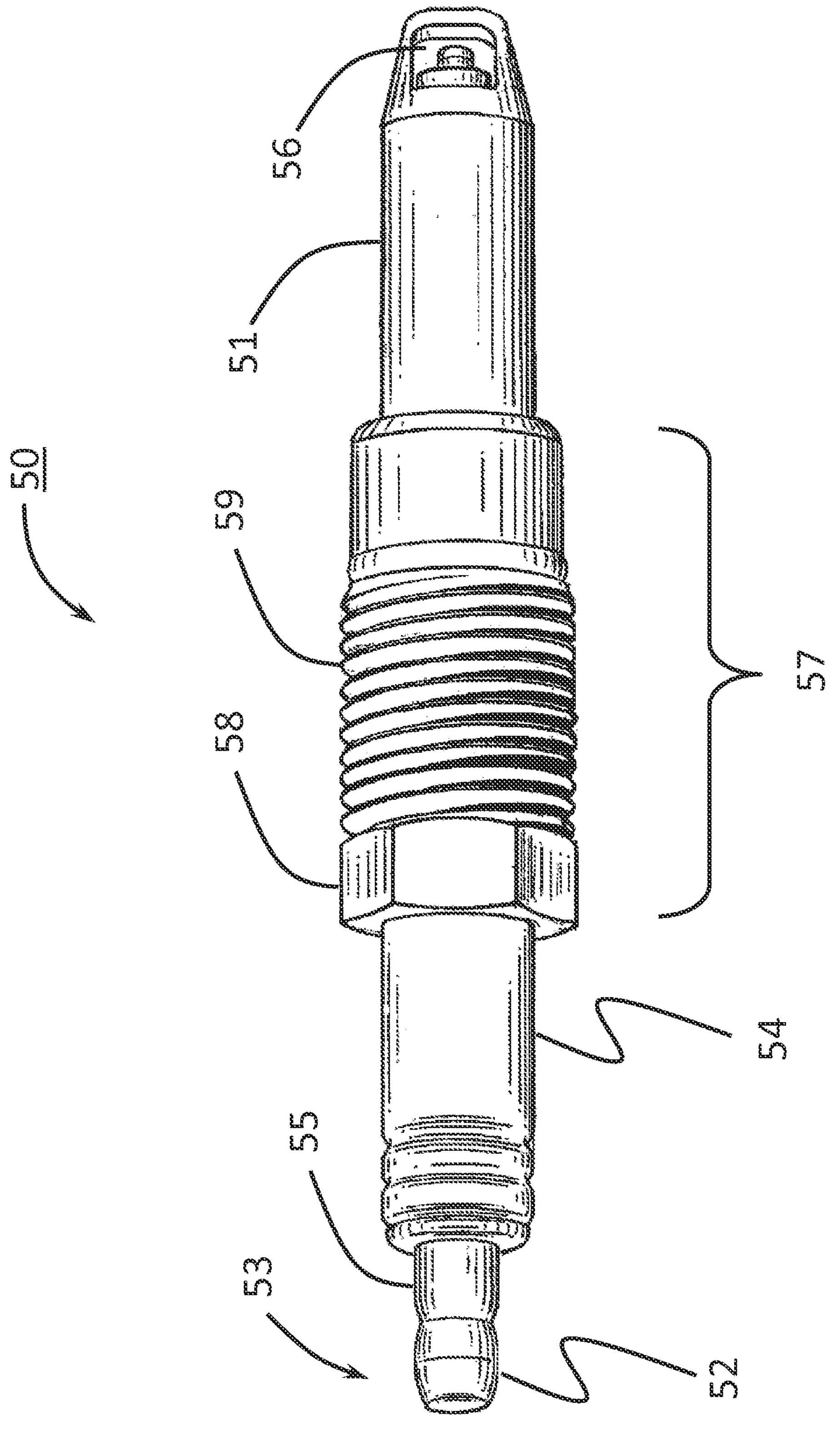
FIG. 1 Background Art
FIG. 1 is a perspective view of a conventional spark plug.

The present invention relates to automotive tools, and more particularly to tools for removing a spark plug, or portions thereof, from an engine. Existing tools and variations thereof for dealing with problems related to spark plug removal have been developed and introduced to the market, and each tends to focus singularly on the removal of broken spark plugs. As a result, conventional tools and methods merely serve to address the symptoms of the problem rather than addressing the root cause of the spark plug breakage itself.

To address the problems with spark plug removal and extraction, various embodiments of the present invention provide for advantageous coupling between a spark plug removal and extraction tool and a spark plug. In one embodiment, the spark plug removal and extraction tool facilitates removal of a complete spark plug from an engine without breaking the spark plug. Other embodiments of the present invention provide for advantageous coupling between a spark plug removal and extraction tool and a portion of a broken spark plug to facilitate removal of the portion of the broken spark plug from an engine. Some preferred embodiments will now be described with reference to the drawing figures, in which like reference numbers refer to like parts throughout.

FIG. 1 is a perspective view of a conventional spark plug 50. The spark plug 50 includes a terminal 52 residing on an outer end 53 that provides an electrical connection for coupling the spark plug 50 to an ignition system; a ceramic or porcelain insulator 54 surrounding an axial conductor 55 known as the center electrode; and a tip 51 located on a lower end of the ceramic or porcelain insulator 54 just opposite the gap 56. The ceramic insulator 54 and center electrode 55 are typically retained within an outer body 57 including a hexagonal nut 58 on one end and an adjacent threaded section 59 on the other end of the outer body 57.

The spark plug 50 is usually installed into the cylinder head of an engine by threading the spark plug 50 threaded section 59 into complementary threads in a plug socket of the cylinder head. The threaded section 59 often has right-handed threads which engage the plug socket by applying a clockwise rotation to the spark plug 50 relative to the cylinder head, looking down on the outer end 53. After many hours of use, and repeated cycles of heating and cooling, removal of the spark plug is often frustrated by fracture of the ceramic insulator 54. In one fracture mode of the spark plug 50, the spark plug tip 51 and ceramic insulator 54 separate from the other elements of the spark plug 50, in particular the outer body 57. Consequently, the unthreaded section of the spark plug containing the spark plug tip 51 may remain within the cylinder head after fracturing the spark plug 50, requiring special apparatus and methods for extraction.

Figure 2:
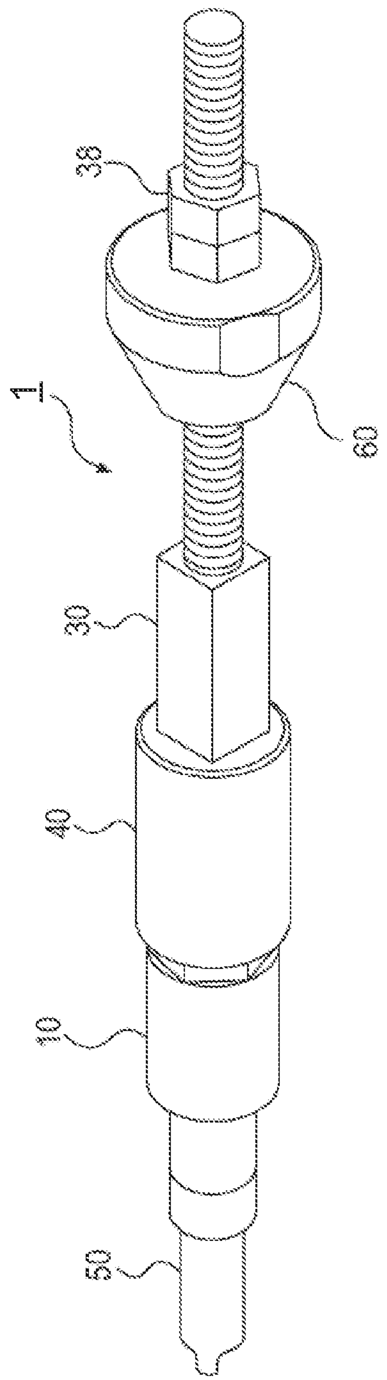
FIG. 2 is a perspective view of a spark plug removal and extraction tool according to an embodiment of the present invention.
Figure 3:
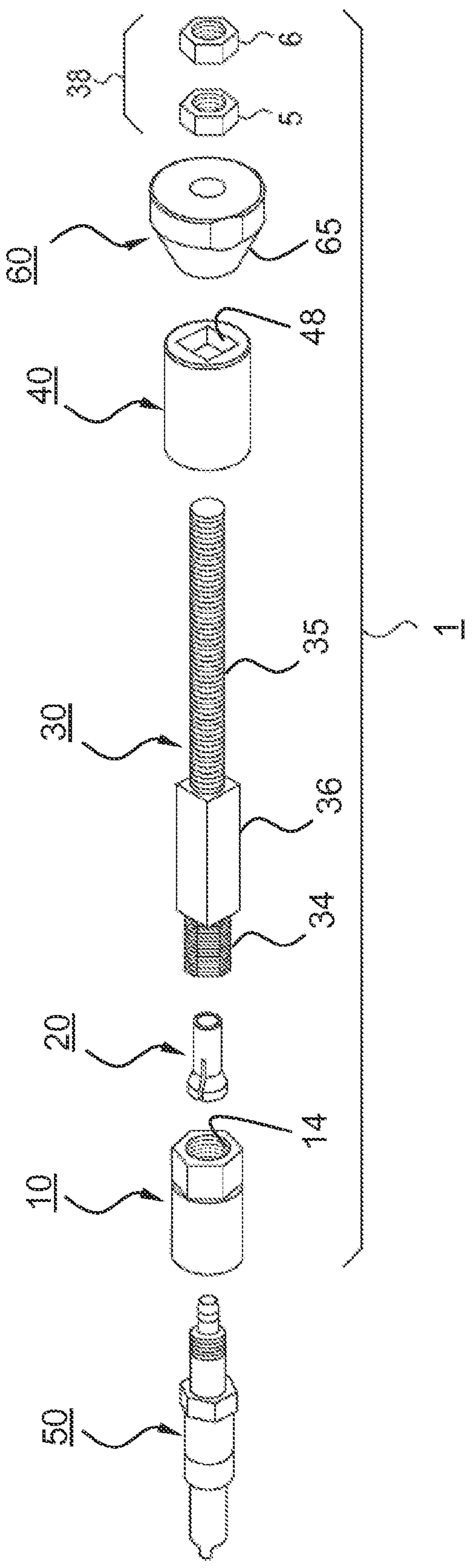
FIG. 3 is an exploded view of the spark plug removal and extraction tool of FIG. 1.

Referring now to FIGS. 2 and 3, it will be appreciated that FIG. 2 is a perspective view of a spark plug removal and extraction tool 1 according to an embodiment of the present invention, and that FIG. 3 shows an exploded view of the spark plug removal and extraction tool 1 of FIG. 2.

The spark plug removal and extraction tool 1 includes a lower socket 10, a radial compression member 20, and a shaft 30. The lower socket 10 is configured to transmit a torque to the spark plug 50. The radial compression member 20 is disposed between the lower socket 10 and the shaft 30 and engages the spark plug terminal 52. In one non-limiting embodiment of the invention, an upper socket 40 slides over the shaft 30 and is configured to transmit a torque to the lower socket 10 through complementary torque engagement portions. In another non-limiting embodiment of the invention, a spacer 60 slides over the shaft 30 and either one threaded nut 5 or two threaded nuts 5, 6 threaded onto the threads 35 of the shaft 30. A single nut 5 threaded onto the shaft 30 allows a user to displace the spacer 60 along an axis 37 of the shaft 30 by rotating the nut 5 relative to the shaft 30. Two nuts 5, 6 torqued one against the other on the threads 35 of the shaft 30 can prohibit relative rotation between either nut 5, 6 and the shaft 30 to allow the user to transmit a torque to the shaft 30.

Figure 4:
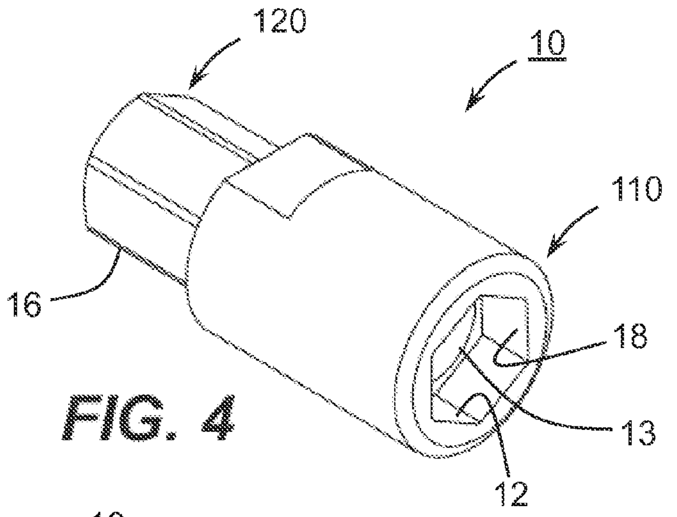
FIG. 4 is a perspective view of a lower socket according to an embodiment of the present invention.
Figure 5:
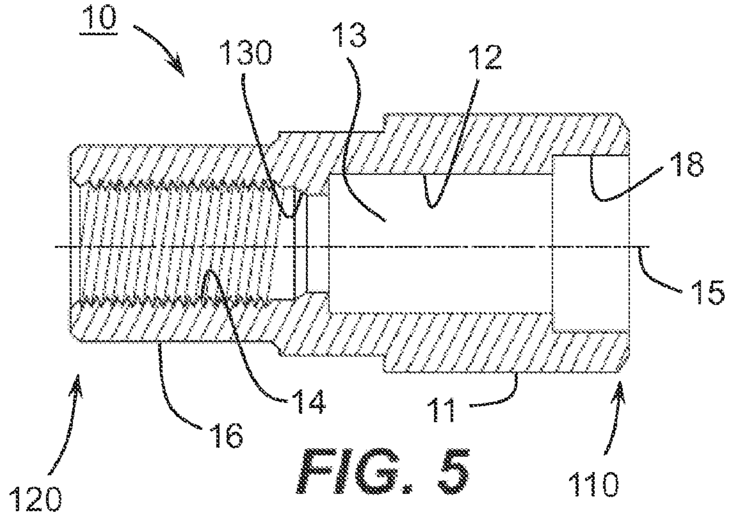
FIG. 5 is a front cross-sectional view of the lower socket of FIG. 4.
Figure 6:
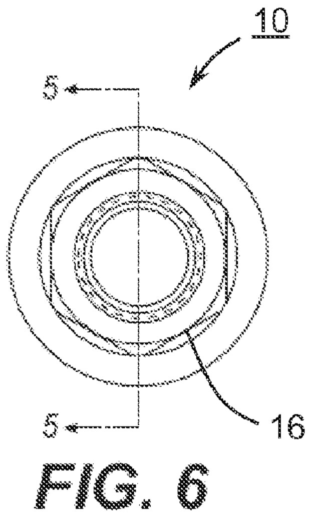
FIG. 6 is a left side view of the lower socket of FIG. 4
Figure 7:
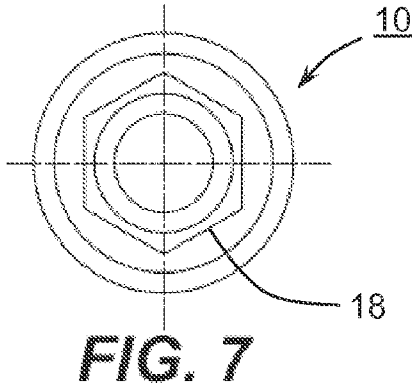
FIG. 7 is a right side view of the lower socket of FIG. 4

Referring now to FIGS. 4-7, it will be appreciated that FIG. 4 is a perspective view of a lower socket 10 according to an embodiment of the present invention; FIG. 5 is a front cross-sectional view of the lower socket 10 of FIG. 4; FIG. 6 is a left side view of the lower socket 10 of FIG. 4; and FIG. 7 is a right side view of the lower socket 10 of FIG. 4.

The lower socket 10 includes an internal surface 12 defining a longitudinal bore 13 therethrough. The internal surface 12 of the lower socket 10 includes a torque engagement portion 18 configured to engage the outer body 57 of the spark plug 50 to transmit a torque from the lower socket 10 to the spark plug 50. In one embodiment, the torque engagement portion 18 has a monolithic shape that extends from a first end 110 of the lower socket 10 in a direction along an axis 15 of the longitudinal bore 13. In another embodiment, the torque engagement portion 18 includes a hexagonal monolithic shape adapted to engage the hex nut 58 on the spark plug 50. However, the torque engagement portion 18 can assume any shape that cooperatively engages the outer body 57 of the spark plug 50 to transmit torque from the lower socket 10 to the spark plug 50.

The longitudinal bore 13 of the lower socket 10 is configured to receive a radial compression member 20 (shown in FIG. 3) therein. Non-limiting examples of the radial compression member 20 include a collet, a sleeve, a sold ferrule, and a split ferrule. Further, the radial compression member 20 may also include a multi-piece assembly such as a ferrule assembly composed of circumferential ferrule sectors, and the like.

Figure 8:
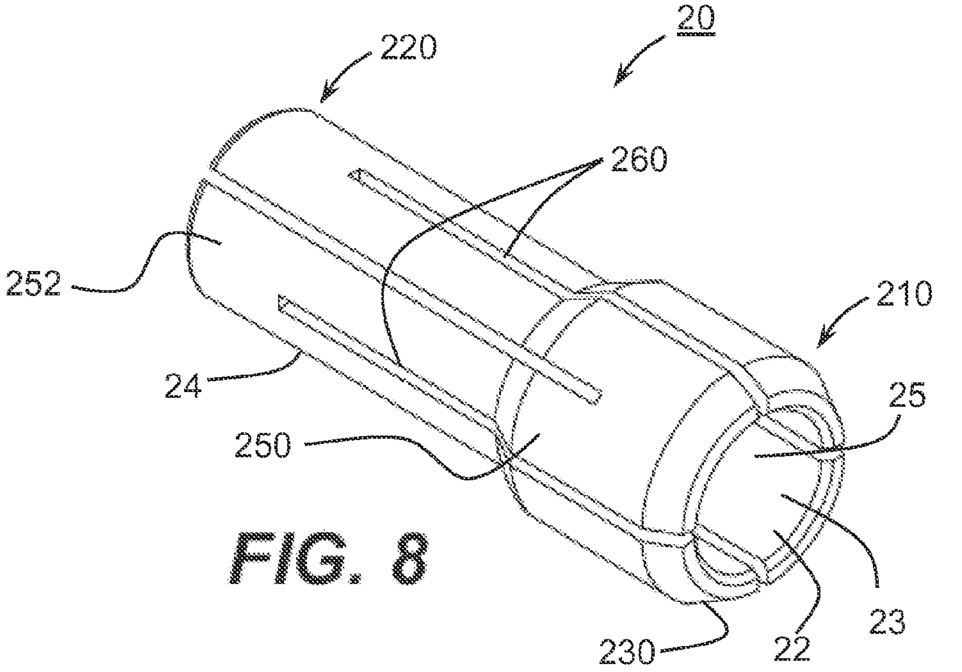
FIG. 8 is a perspective view of a radial compression member according to an embodiment of the present invention.
Figure 9:
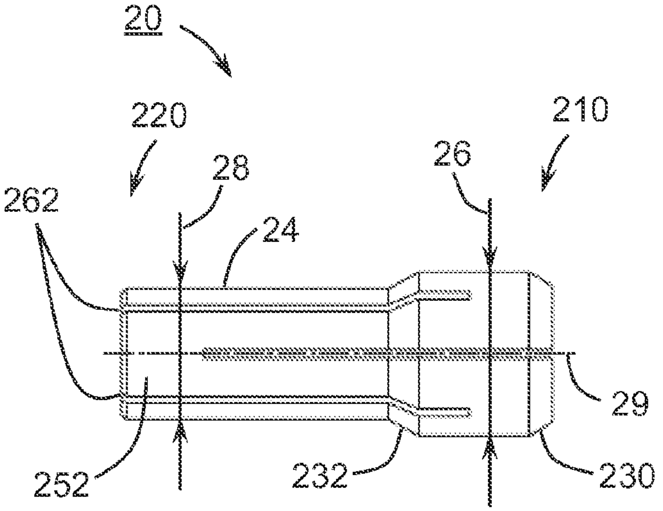
FIG. 9 is a front view of the radial compression member of FIG. 8.
Figure 10:
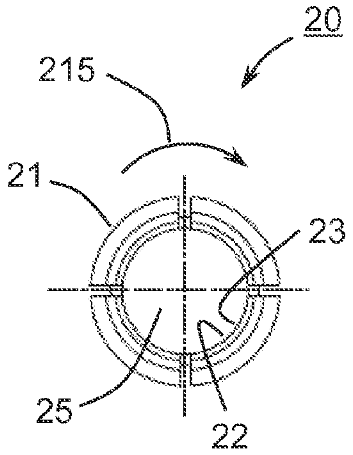
FIG. 10 is a right side view of the radial compression member of FIG. 8.

Referring now to FIGS. 8-10, it will be appreciated that FIG. 8 is a perspective view of a radial compression member 20 according to an embodiment of the present invention; FIG. 9 is a front view of the radial compression member 20 of FIG. 8; and FIG. 10 is a right side view of the radial compression member 20 of FIG. 8.

Figure 23:
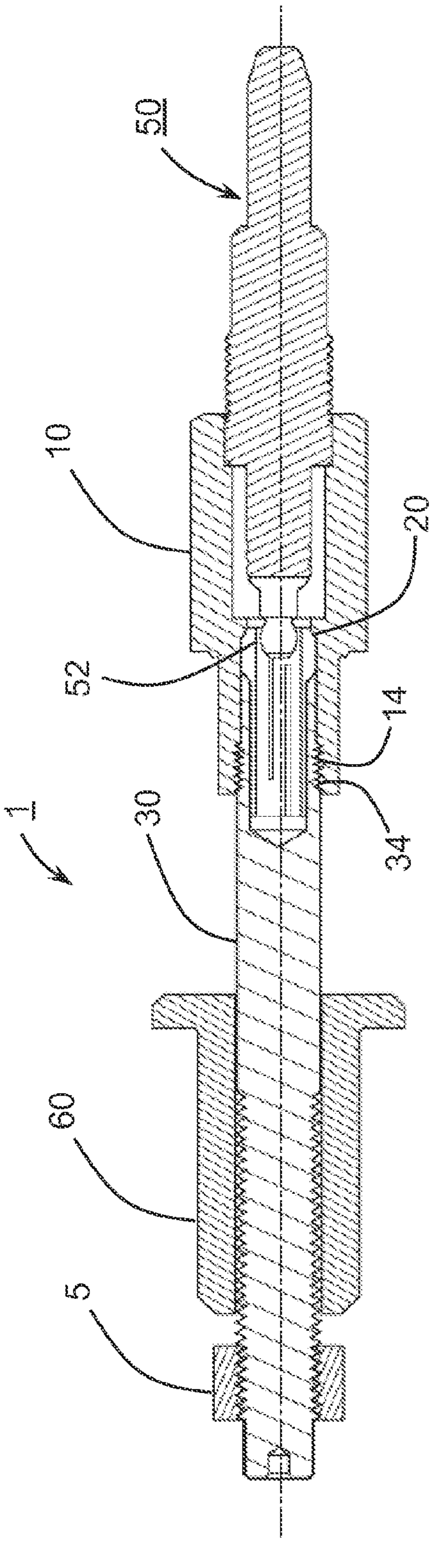
FIG. 23 is a front cross-sectional view of the spark plug removal and extraction tool of FIG. 22.

The radial compression member 20 includes an internal surface 22 adapted to engage the spark plug terminal 52 in radial compression (see FIG. 23). In one non-limiting embodiment, the internal surface 22 includes a concavity 23 that faces a longitudinal axis of the spark plug terminal 52 when engaging the spark plug terminal 52 (see FIG. 23). In another non-limiting embodiment, the internal surface 22 defines a longitudinal bore 25 extending from a first end 210 of the radial compression member 20 along a longitudinal axis 29 of the radial compression member 20, where the bore 25 is configured to at least partially surround the spark plug terminal 52 (see FIG. 23). The bore 25 may extend all the way through the radial compression member 20, or alternatively, the bore 25 may terminate within the radial compression member 20.

Furthermore, the internal surface 22 of the radial compression member 20 may have a smooth surface, or alternatively may have projections extending from the internal surface 22 in an inward radial direction. Non-limiting examples of the projections extend from the internal surface 22 include circumferential ridges, axial ridges, helical ridges, spikes, knurling, and the like. The projections extending from the internal surface 22 of the radial compression member 20 may advantageously deform the spark plug terminal 52 (see FIG. 23) upon application of a radial compression force to the radial compression member 20 to increase gripping strength between the radial compression member 20 and the spark plug 50. Alternatively, the radial compression member 20 may deform around the spark plug terminal 52 (see FIG. 23) in a radially inward direction upon application of a radial compressive force to better conform to the shape of the spark plug terminal 52, thereby also increasing gripping strength between the radial compression member 20 and the spark plug 50.

The radial compression member 20 may include rigid materials such as, for example, carbon steel, stainless steel, nickel alloys, stone, ceramics, and the like. Alternatively, the radial compression member 20 may include more malleable materials such as, for example, copper, aluminum, plastic, fibrous materials such as paper or textiles, wood, graphite, and the like.

Referring to FIGS. 4-7, the internal surface 12 of the lower socket 10 may have a converging section 130 that tapers in a longitudinal direction toward the torque engagement portion 18. The converging section 130 may be configured to displace an outer surface 24 of the radial compression member 20 (see FIG. 23) in a radial direction toward a longitudinal axis 15 of the lower socket 10 when the radial compression member 20 is translated in a longitudinal direction toward the torque engagement portion 18. Inward radial displacement of the radial compression member 20 against the spark plug terminal 52 effects a gripping force between the radial compression member 20 and the spark plug terminal 52 that can transmit torque or axial force from the radial compression member 20 to the spark plug 50.

Alternatively, referring to FIGS. 8-10, the radial compression member 20 may include a tapered outer surface 230 that converges in an axial direction toward the first end 210 of the radial compression member 20, where the first end 210 of the radial compression member is closest to the torque engagement portion 18 of the lower socket 10. Thus, translating the tapered outer surface 230 of the radial compression member 20 against the internal surface 12 of the lower socket 10 in an axial direction may act to displace an outer surface 24 of the radial compression member 20 in an inward radial direction, that is, toward a longitudinal axis 15 of the lower socket 10. Accordingly, inward radial displacement of the radial compression member 20 against the spark plug terminal 52 effects a gripping force between the radial compression member 20 and the spark plug terminal 52 that can transmit torque or axial force from the radial compression member 20 to the spark plug 50.

In one non-limiting embodiment of the present invention, a tapered outer surface 230 of the radial compression member 20 may bear against a converging section 130 of the lower socket 10 (see FIG. 5) as the radial compression member 20 is translated in an axial direction toward the torque engagement portion 18 of the lower socket 10. In turn, axial displacement of the radial compression member 20 toward the lower socket 10 may effect an inward radial displacement of outer surface 24 of the radial compression member 20. Accordingly, inward radial displacement of the radial compression member 20 against the spark plug terminal 52 (see FIG. 23) effects a gripping force between the radial compression member 20 and the spark plug terminal 52 that can transmit torque or axial force from the radial compression member 20 to the spark plug 50.

Figure 21:
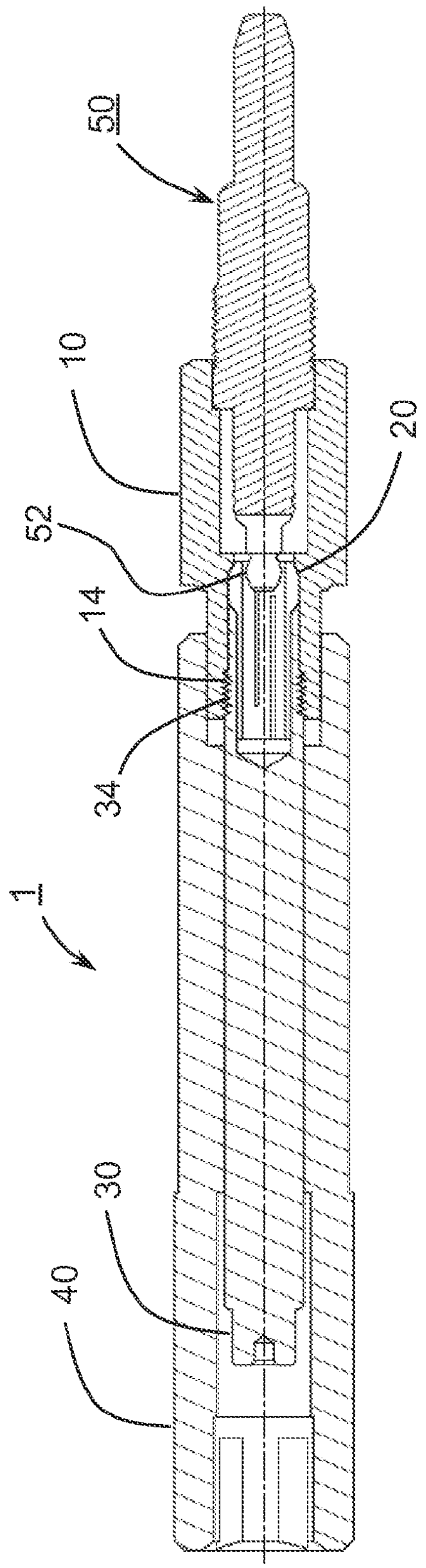
FIG. 21 is a front cross-sectional view of the spark plug removal and extraction tool of FIG. 20.
Figure 22:
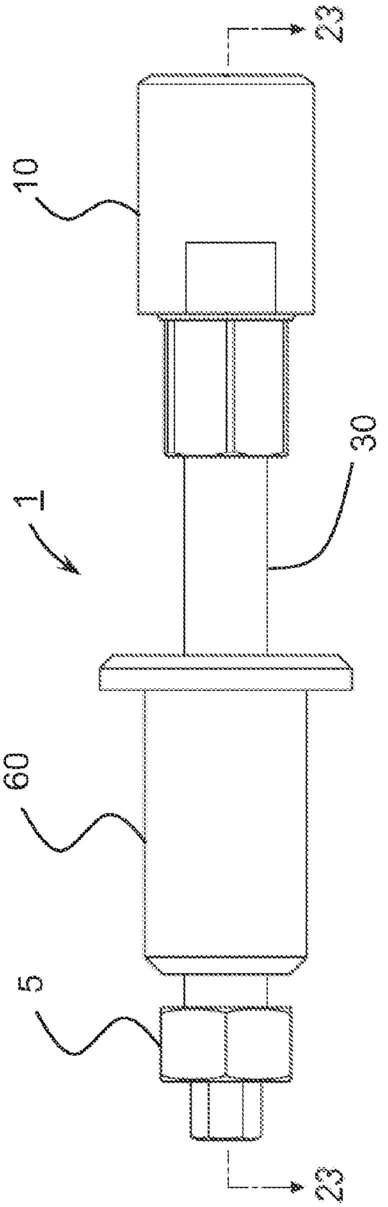
FIG. 22 is a front view of a spark plug removal and extraction tool according to an embodiment of the present invention.

Referring to FIGS. 21 and 23, the shaft 30 may bear against the radial compression member 20 in a longitudinal direction toward the lower socket 10 to effect an axial displacement of the radial compression member 20 relative to the lower socket 10. The threads 14 on the lower socket 10 may cooperate with the threads 34 on the shaft 30 to create a compressive axial force against the radial compression member 20 that effects a translation of the radial compression member 20 toward the torque engagement portion 18 of the lower socket. The threads 14 may be disposed on the internal surface 12 of the lower socket 10 and the corresponding threads 34 are disposed on an outer surface of the shaft 30. Alternatively, the threads 14 may be disposed on an external surface 11 of the lower socket 10 and the corresponding threads 34 are disposed on an internal surface 32 of the shaft 30.

Figures 11, 12, 13:
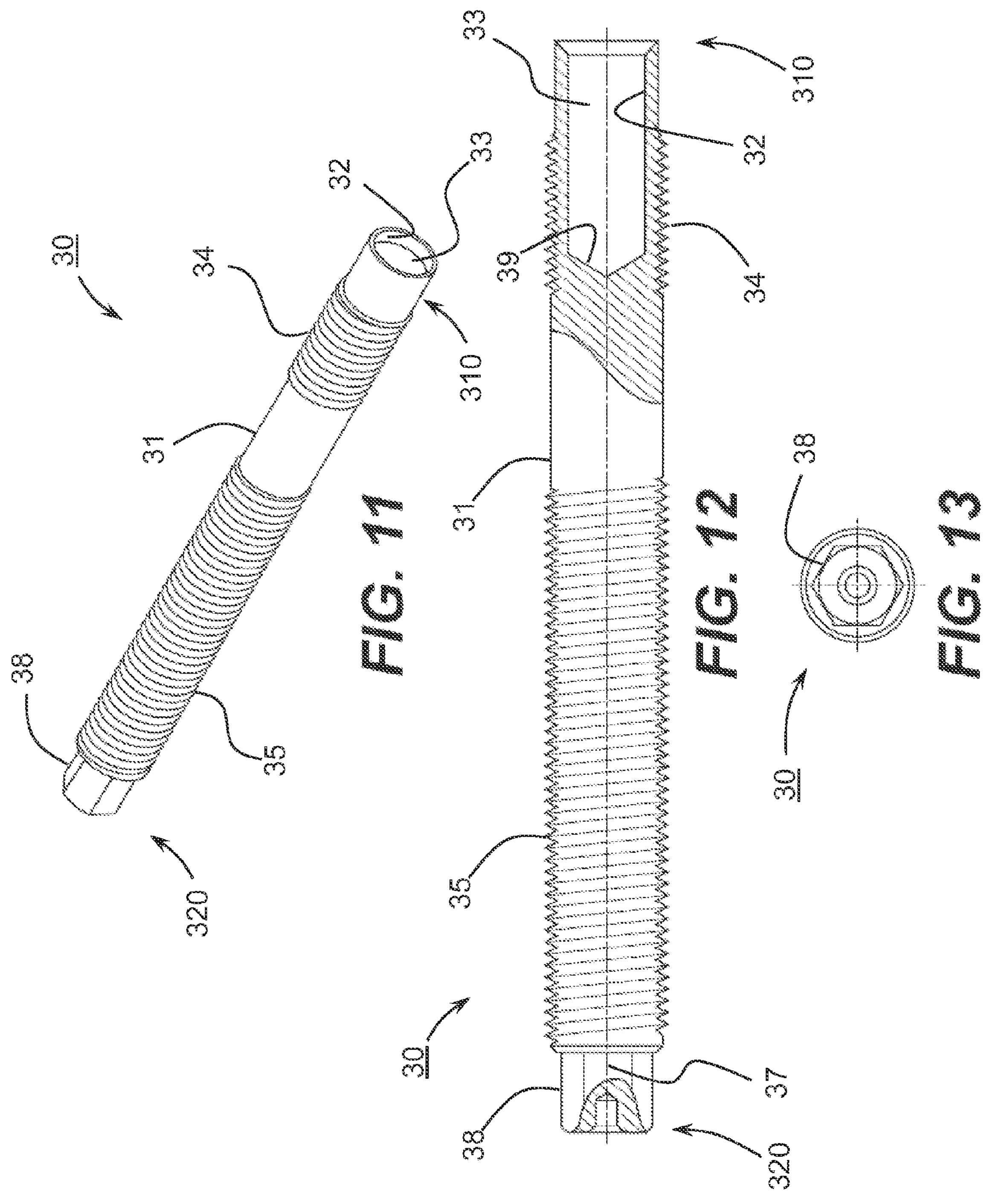
FIG. 11 is a perspective view of a shaft according to an embodiment of the present invention.
FIG. 12 is a front, partial cross-sectional view of the shaft of FIG. 11.
FIG. 13 is a left side view of the shaft of FIG. 11

Referring now to FIGS. 11-13, it will be appreciated that FIG. 11 is a perspective view of a shaft 30 according to an embodiment of the present invention; FIG. 12 is a front, partial cross-sectional view of the shaft 30 of FIG. 11; and FIG. 13 is a left side view of the shaft 30 of FIG. 11.

A torque engagement portion 38 on the shaft 30 may advantageously provide a surface for applying a torque to the shaft 30, in order to engage the threads 34 of the shaft 30 with the threads 14 of the lower socket 10. Non-limiting examples of the torque engagement portion 38 of the shaft 30 may include a single flat surface, a pair of opposing flat surfaces on either an interior or exterior of the shaft 30, any polygonal array of flat surfaces on either an interior or exterior of the shaft 30, a shear pin, or the like. Further, two nuts 5, 6 torqued against one another on the threads 35 of the shaft 30 may compose the torque engagement portion 38.

In one non-limiting embodiment of the invention, the shaft 30 may include an internal surface 32 that extends from a first end 310 of the shaft 30 toward a second end 320 of the shaft 30 to define a recess 33 therein. Further, an end of the radial compression member 20 may be disposed in the recess 33 of the shaft 30 when the shaft threads 34 engage the lower socket threads 14.

In another non-limiting embodiment of the invention, the internal surface 32 of the shaft 30 may include a converging section 39 that tapers in a longitudinal direction away from the first end 310 of the shaft 30, such that an axial translation of the radial compression member 20 in the recess 33 may effect an inward radial displacement of an outer surface 24 of the radial compression member 20 toward a longitudinal axis of the spark plug terminal 52. Such an inward radial displacement of the radial compression member 20 against the spark plug terminal 52 (see FIG. 23) creates a gripping force between the radial compression member 20 and the spark plug terminal 52 that can sustain transfers of torque and axial force from the radial compression member 20 to the spark plug 50.

In a non-limiting embodiment of the invention shown in FIGS. 8-10, the radial compression member 20 includes an axially cantilevered portion 250 defined by a pair of longitudinal slits 260 that extend from a first end 210 of the radial compression member 20 and that extend through an annular thickness of the radial compression member 20. In another non-limiting embodiment of the invention, the radial compression member 20 further includes an axially cantilevered portion 252 defined by a pair of longitudinal slits 262 that extend from a second end 220 of the radial compression member 20 and that extend through an annular thickness of the radial compression member 20.

The radial compression member 20 may include any number of axially cantilevered portions 250 disposed on a first end 210 of the radial compression member 20, and may include any number of axially cantilevered portions 252 disposed on a second end 220 of the radial compression member 20. In one advantageous embodiment of the invention, the radial compression member 20 includes between 1 and 4 axially cantilevered portions 250 at the first end 210 of the radial compression member 20. In yet another advantageous embodiment of the invention, the radial compression member 20 further includes between 1 and 4 axially cantilevered portions 252 at the second end 220 of the radial compression member 20. Any of the axially cantilevered portions 250, 252 of the radial compression member 20 may include a concavity 23 on its internal surface 22.

One of the pair of longitudinal slits 260 may be disposed at an azimuthal location around the radial compression member 20 between the azimuthal locations of the pair of longitudinal slits 262. Further, all adjacent longitudinal slits in an azimuthal direction 215 around the radial compression member 20 may extend from opposite ends of the radial compression member 20.

The radial compression member 20 may have a first outer dimension 26 transverse to the longitudinal axis 29 that is greater than a second dimension 28 transverse to the longitudinal axis 29. The radial compression member 20 may include tapered outer surfaces 230, 232 on either side of the axial location of the first outer dimension 26, where the tapered outer surfaces 230, 232 decrease in radial dimension with axial distance away from the axial location of the first outer dimension 26.

Figure 14:
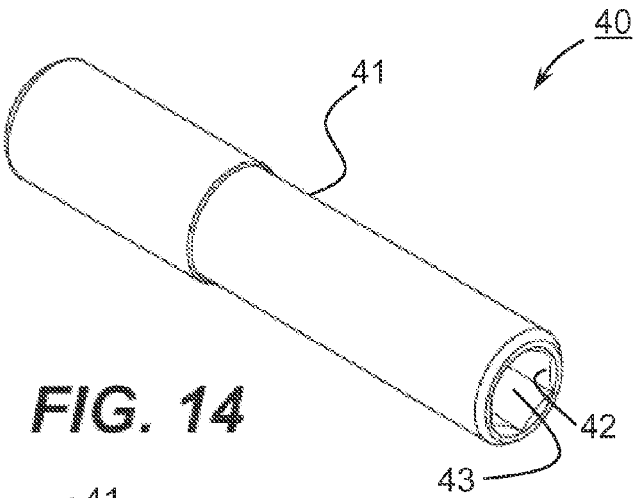
FIG. 14 is a perspective view of an upper socket according to an embodiment of the present invention.
Figure 15:
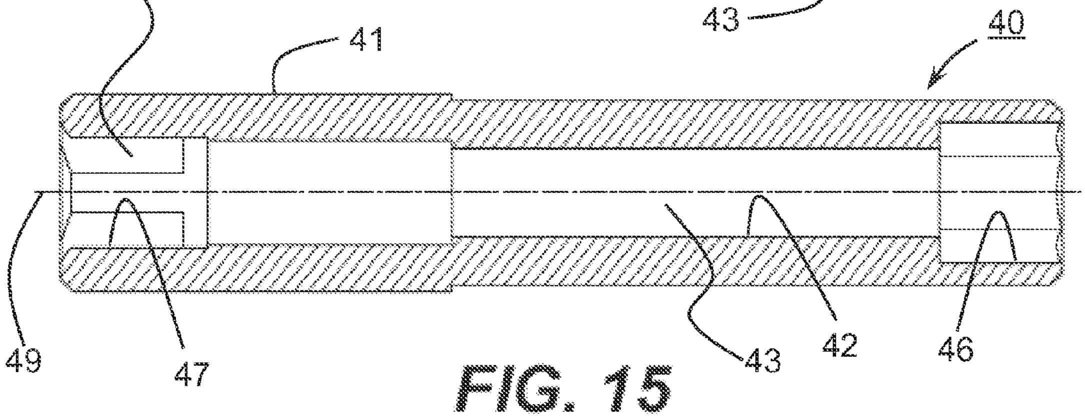
FIG. 15 is a front cross-sectional view of the upper socket of FIG. 14.
Figure 16:
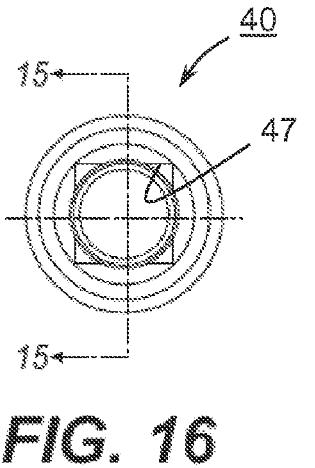
FIG. 16 is a left side view of the upper socket of FIG. 14.
Figure 17:
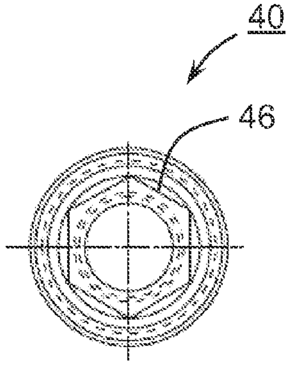
FIG. 17 is a right side view of the upper socket of FIG. 14.

Referring now to FIGS. 14-17, it will be appreciated that FIG. 14 is a perspective view of an upper socket 40 according to an embodiment of the present invention; FIG. 15 is a front cross-sectional view of the upper socket 40 of FIG. 14; FIG. 16 is a left side view of the upper socket 40 of FIG. 14; and FIG. 17 is a right side view of the upper socket 40 of FIG. 14.

The upper socket 40 includes an internal surface 42 defining an internal bore 43. The internal surface 42 includes a torque engagement portion 46 that is configured to transmit a torque to the lower socket 10 by coupling with the torque engagement portion 16 of the lower socket 10. The torque engagement portions 46 and 16 could include any complementary structures that cooperate to provide circumferential interference between the upper socket 40 and the lower socket 10 to transmit a torque therebetween. Non-limiting examples of the torque engagement portions 46 and 16 of the upper socket 40 and lower socket 10, respectively, include a single flat surface, a pair of opposing flat surfaces, any polygonal array of flat surfaces, a shear pin, or the like. In one advantageous embodiment of the invention, the torque engagement portion 46 of the upper socket 40 includes a hexagonal array of flat surfaces on its internal surface 42, and the torque engagement portion 16 of the lower socket includes hexagonal array of flat surfaces on its external surface 11 that are complementary to the torque engagement portion 46 of the upper socket 40.

Optionally, as shown in the embodiment illustrated in FIG. 3, the upper socket may include a torque engagement portion 48 that is configured to transmit a torque to the shaft 30 by engaging a torque engagement portion 36 of the shaft 30. The torque engagement portions 48 and 36 could include any complementary structures that cooperate to provide circumferential interference between the upper socket 40 and the shaft 30 to transmit a torque therebetween. Non-limiting examples of the torque engagement portions 48 and 36 of the upper socket 40 and shaft 30, respectively, include a single flat surface, a pair of opposing flat surfaces, any polygonal array of flat surfaces, a shear pin, or the like. In one advantageous embodiment of the invention, the torque engagement portion 48 of the upper socket 40 includes a rectangular array of flat surfaces on its internal surface 42, and the torque engagement portion 36 of the shaft 30 includes a rectangular array of flat surfaces on its external surface 31 that are complementary to the torque engagement portion 48 of the upper socket 40.

In another embodiment of the invention, the upper socket 40 includes a torque engagement portion 47 that is configured to transmit a torque to the upper socket 40. Non-limiting examples of the torque engagement portion 47 on the upper socket 40 may include a single flat surface, a pair of opposing flat surfaces, any polygonal array of flat surfaces, a shear pin, or the like. In one advantageous embodiment of the invention, the torque engagement portion 47 is a square array of flat surfaces disposed on an internal surface 42 of the upper socket 40 or another axial recess 45 of the upper socket. In another advantageous embodiment of the invention, the torque engagement portion 47 is a square array of flat surfaces that are configured to engage a standard ¼, ⅜, or ½ in drive socket wrench.

Figure 18:
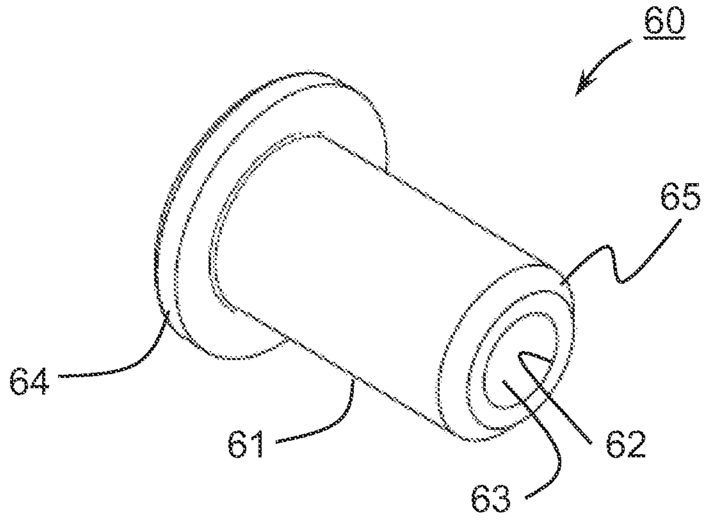
FIG. 18 is a perspective view of a spacer according to an embodiment of the present invention.
Figure 19:
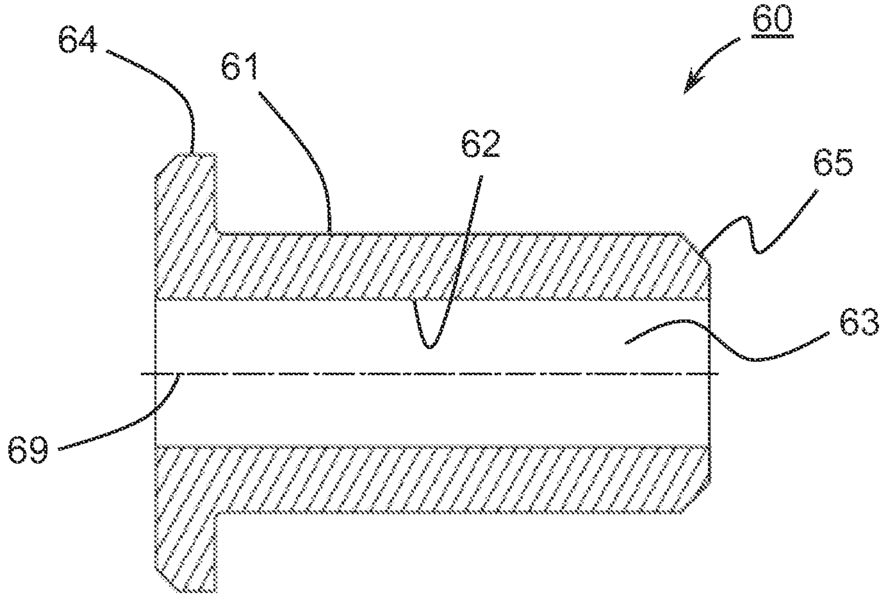
FIG. 19 is a front cross-sectional view of the spacer of FIG. 18.

Referring now to FIGS. 18-19, it will be appreciated that FIG. 18 is a perspective view of a spacer 60 according to an embodiment of the present invention; and FIG. 19 is a front cross-sectional view of the spacer 60 of FIG. 18.

The spacer 60 has an internal surface 62 defining a longitudinal bore 63 therethrough. The external surface 61 of the spacer 60 may have a taper 65 that converges in a direction along the longitudinal axis 69 of the spacer 60. Further, the spacer 60 may have a flange 64 that extends at least partly in an outward radial direction.

The following describes advantageous embodiments of the present invention for preventing the fracture of an intact spark plug 50 upon removal. First, as best shown in FIG. 21, the lower socket 10 is installed around the spark plug 50 such that the torque engagement portion 18 on the lower socket 10 engages the spark plug outer body 57. The torque engagement portion 18 may engage the spark plug 50 hex nut 58.

Second, as best shown in FIG. 21, the radial compression member 20 is disposed around the spark plug terminal 52 and within the longitudinal bore 13 of the lower socket, and the shaft 30 threads 34 are coupled with the lower socket 10 threads 14. Engaging the threads 34 with the threads 14 effects an inward radial displacement of an outer surface 21 of the radial compression member 20 toward a longitudinal axis of the spark plug 50 terminal 52, thereby creating a radial gripping force between the radial compression member 20 and the spark plug terminal 52. The radial gripping force enables transmission of torque and axial force from the radial compression member 20 to the spark plug 50. Further, compressive force between the lower socket 10 and the radial compression member 20 acts to prevent relative motion therebetween after compressing the radial compression member 20 within the lower socket 10.

Third, as best shown in FIG. 21, the upper socket 40 is installed on the lower socket 10 such that the torque engagement portion 46 of the upper socket 40 engages the torque engagement portion 16 of the lower socket 10.

In a first non-limiting embodiment, as shown in FIG. 3, for example, the torque engagement portion 48 of the upper socket 40 also engages the torque engagement portion 36 of the shaft 30. Further, the spacer 60 is installed around the shaft 30 and onto an upper portion of the upper socket 40. Two nuts 5, 6 are threaded onto the shaft 30 on top of the tapered spacer 60 and torqued against one another to lock the two nuts 5, 6 in a fixed axial position along the shaft 30. With the tool 1 firmly attached to the spark plug 50 and aligned to minimize the occurrence of shearing forces, the user applies torque to the shaft 30 to remove the spark plug 50 from the engine.

Figure 20:
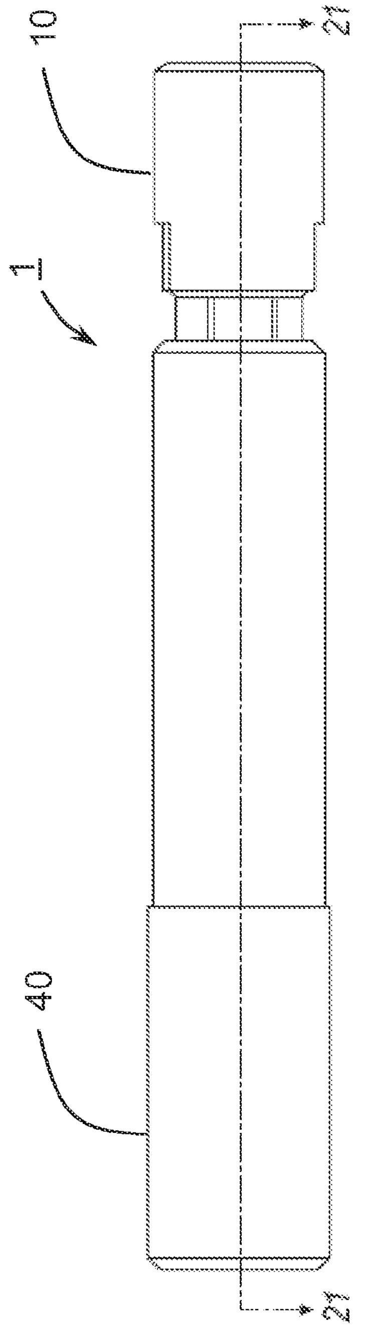
FIG. 20 is a front view of a spark plug removal and extraction tool according to an embodiment of the present invention.

In a second non-limiting embodiment, as shown in FIGS. 20 and 21, for example, the user applies torque to the torque engagement portion 47 of upper socket 40 to remove the spark plug 50 from the engine without any direct torque transfer between the upper socket 40 and the shaft 30.

According to either the first or second embodiments above, the torque applied to the tool 1 to remove the spark plug 50 from the engine is distributed between the spark plug outer body 57 and the terminal 52 to prevent relative motion between the spark plug outer body 57 and terminal 52 during the removal procedure. In turn, the combination of enhanced contact and fixed longitudinal alignment reduces shearing loads within the spark plug 50 by maintaining a consistent rotational torque load along an extended portion of the spark plug 50, which serves to minimize the occurrence of broken spark plugs during extraction.

Advantageous embodiments of the present invention address the problem of spark plug 50 extraction not only by mitigating the occurrence of spark plug 50 fractures during removal, but also by providing an enhanced extraction apparatus and method for extracting fractured spark plugs 50. The following describes embodiments of the present invention for extracting a fractured spark plug 50 including the axial conductor 55 but absent its outer body 57, which includes the hex nut 58 and the threads 59.

First, as best shown in FIG. 23, the lower socket 10 is installed around the spark plug 50. Second, the radial compression member 20 is disposed around the spark plug terminal 52 and within the longitudinal bore 13 of the lower socket 10, and the shaft 30 threads 34 are coupled with the lower socket 10 threads 14. Engaging the threads 34 with the threads 14 effects an inward radial displacement of an outer surface 21 of the radial compression member 20 toward a longitudinal axis of the spark plug 50 terminal 52, thereby creating a gripping force between the radial compression member 20 and the spark plug terminal 52. The radial gripping force enables transmission of torque and axial force from the radial compression member 20 to the spark plug 50. Further, compressive force between the lower socket 10 and the radial compression member 20 acts to prevent relative motion therebetween after compressing the radial compression member 20 within the lower socket 10.

Third, as best shown in FIG. 23, the spacer 60 is disposed on the shaft 30 by inserting the shaft 30 through the longitudinal bore 63 of the spacer until the spacer 60 bears, directly or indirectly, against a surface of the engine. Advantageously, the spacer 60 may align the longitudinal axis 37 with a longitudinal axis of the spark plug 50. Fourth, a nut 5 is threaded onto the threads 35 of the shaft 30 until the nut bears on the spacer 60. Continuing to tighten the nut 5 creates an axial force on the spark plug terminal 52, away from the engine, by a jack screw effect of forcing the spacer against the engine surface, thereby shortening the distance between the nut 5 and the spark plug terminal 52 as the spark plug is removed from the engine. The compressive force exerted between the radial compression member 20 and the spark plug terminal 52, in combination with the alignment function of the spacer 60, enable the extraction of broken spark plug tips 51 and ceramic insulators 54.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A spark plug removal and extraction tool, comprising:

a lower socket having an internal surface defining a longitudinal bore therethrough;

a first threaded portion included on the internal surface of the lower socket;

a radial compression member disposed in the longitudinal bore of the lower socket, the radial compression member including an internal surface defining a concavity that faces a longitudinal axis of the longitudinal bore of the lower socket;

a shaft disposed on a first end of the radial compression member;

a second threaded portion included on the shaft, the second threaded portion being complementary to the first threaded portion; and an upper socket having an internal surface defining a longitudinal bore therein, the shaft being disposed within the longitudinal bore of the upper socket.

2. The tool of claim 1, wherein the shaft has an internal surface extending from a first end of the shaft toward a second end of the shaft, the internal surface of the shaft defining a longitudinal recess therein, and wherein the radial compression member is disposed in the longitudinal recess of the shaft.

3. The tool of claim 1, wherein the second threaded portion is included on an external surface of the shaft, and a first end of the shaft is disposed within the longitudinal bore of the lower socket.

4. The tool of claim 1, further comprising:

a first torque engagement portion on the lower socket, the first torque engagement portion configured to transmit a torque to the lower socket; and a second torque engagement portion on the upper socket, wherein the second torque engagement portion is coupled to the first torque engagement portion.

5. The tool of claim 4, further comprising:

a third torque engagement portion on the shaft, the third torque engagement portion configured to transmit a torque to the shaft; and a fourth torque engagement portion on the upper socket, wherein the fourth torque engagement portion is coupled to the third torque engagement portion.

6. The tool of claim 1, further comprising a torque engagement portion on the shaft, the torque engagement portion being configured to transmit a torque to the shaft.

7. The tool of claim 1, wherein the radial compression member is a collet including at least one axially cantilevered portion defined by a first pair of longitudinal slits extending from a first end of the collet and extending through an annular thickness of the collet, and wherein a first outer dimension of the collet measured transverse to a longitudinal axis of the collet is greater than a second outer dimension of the collet measured transverse to the longitudinal axis of the collet.

8. The tool of claim 7, wherein:

the at least one axially cantilevered portion consists of a plurality of axially cantilevered portions, at least one of the plurality of axially cantilevered portions is defined by a second pair of longitudinal slits extending from a second end of the collet and extending through the annular thickness of the collet, and the first end of the collet is opposite the second end of the collet.

9. A tool kit for removing a spark plug from an engine, comprising:

a lower socket including a lower socket internal surface defining a lower socket longitudinal bore therethrough, a first threaded portion, a first torque engagement portion configured to transmit a first torque to the lower socket, and a second torque engagement portion configured to couple with a torque engagement portion of the spark plug;

a radial compression member including a radial compression member internal surface defining a concavity;

a shaft including a second threaded portion complementary to the first threaded portion of the lower socket, and a third torque engagement portion configured to transmit a second torque to the shaft; and an upper socket including an upper socket internal surface defining an upper socket longitudinal bore therethrough, and a fourth torque engagement portion configured to couple with the first torque engagement portion of the lower socket.

10. The tool kit of claim 9, wherein the shaft further includes a fifth torque engagement portion, and wherein the upper socket includes a sixth torque engagement portion configured to transmit a torque to the shaft through engagement with the fourth torque engagement portion of the shaft.

11. The tool kit of claim 9, wherein the radial compression member includes at least one of a collet, a sleeve, a solid ferrule, and a split ferrule.

12. The tool kit of claim 11, wherein the radial compression member is a collet including at least one axially cantilevered portion defined by a first pair of longitudinal slits extending from a first end of the collet and extending through an annular thickness of the collet, and wherein a first outer dimension of the collet measured transverse to a longitudinal axis of the collet is greater than a second outer dimension of the collet measured transverse to the longitudinal axis of the collet.

13. The tool kit of claim 9, further comprising a spacer including a fourth internal surface defining a third longitudinal bore therethrough, wherein the shaft further includes a third threaded portion disposed on an outer surface of the shaft.

14. A tool kit for removing a spark plug from an engine, comprising:

a lower socket including a lower socket internal surface defining a lower socket longitudinal bore therethrough, first means for coupling the lower socket to a shaft, means for transmitting a first torque to the lower socket, and means for transmitting a second torque from the lower socket to the spark plug;

a radial compression member including a radial compression member internal surface defining a concavity, wherein the shaft includes:

second means for coupling the lower socket to the shaft, the second means for coupling the lower socket to the shaft being complementary to the first means for coupling the lower socket to the shaft, and means for transmitting a third torque to the shaft; and an upper socket including an upper socket internal surface defining an upper socket longitudinal bore, and means for coupling the upper socket with the means for transmitting the first torque to the lower socket.

15. The tool of claim 1, further comprising:

a first torque engagement portion on the shaft, the first torque engagement portion configured to transmit a torque to the shaft; and a second torque engagement portion on the upper socket, wherein the second torque engagement portion is coupled to the first torque engagement portion.

* * * * *